US008555263B2

(12) United States Patent
Allen et al.

(10) Patent No.: US 8,555,263 B2
(45) Date of Patent: Oct. 8, 2013

(54) SYSTEM AND METHOD FOR CODE AUTOMATION

(75) Inventors: Douglas Allen, Middletown, CT (US); Laura Gaulzetti, Newington, CT (US)

(73) Assignee: Aetna Inc., Hartford, CT (US)

( * ) Notice: Subject to any disclaimer, the term of this patent is extended or adjusted under 35 U.S.C. 154(b) by 265 days.

(21) Appl. No.: 12/954,283

(22) Filed: Nov. 24, 2010

(65) Prior Publication Data

US 2011/0179404 A1 Jul. 21, 2011

Related U.S. Application Data

(60) Provisional application No. 61/296,737, filed on Jan. 20, 2010.

(51) Int. Cl.
G06F 9/45 (2006.01)

(52) U.S. Cl.
USPC .......................................... 717/143

(58) Field of Classification Search
None
See application file for complete search history.

(56) References Cited

U.S. PATENT DOCUMENTS

| 4,118,788 | A | 10/1978 | Roberts |
| 5,519,859 | A * | 5/1996 | Grace ............................ 707/690 |
| 5,787,418 | A * | 7/1998 | Hibbetts et al. ........................ 1/1 |
| 5,812,840 | A * | 9/1998 | Shwartz ................................ 1/1 |
| 6,604,102 | B2 * | 8/2003 | Klein et al. ............................ 1/1 |
| 6,625,613 | B2 * | 9/2003 | Thompson ............................. 1/1 |
| 6,971,085 | B1 | 11/2005 | Alcorn |
| 6,996,557 | B1 * | 2/2006 | Leung et al. ........................... 1/1 |
| 7,065,522 | B2 * | 6/2006 | Taylor et al. .......................... 1/1 |
| 7,421,442 | B2 * | 9/2008 | Gelb et al. ............................ 1/1 |
| 7,765,226 | B2 * | 7/2010 | Dettinger et al. ............. 707/768 |
| 8,019,750 | B2 * | 9/2011 | Kosciusko et al. ............. 707/718 |
| 8,302,080 | B2 * | 10/2012 | Wassermann et al. ........ 717/131 |
| 2004/0002994 | A1 * | 1/2004 | Brill et al. .................. 707/104.1 |
| 2004/0215604 | A1 * | 10/2004 | Ivanov ............................... 707/3 |
| 2004/0230555 | A1 | 11/2004 | Phenix et al. |

(Continued)

FOREIGN PATENT DOCUMENTS

| GB | 2402237 A | * 12/2004 |
| JP | 2000029898 A | * 1/2000 |
| WO | PCT/US10/58023 | 11/2010 |

OTHER PUBLICATIONS

"Conceptual Queries using ConQuer-II", Bloesch et al., This paper was presented at ER'97: 16th International Conference on Conceptual Modeling.*

(Continued)

Primary Examiner — Don Wong
Assistant Examiner — Daxin Wu
(74) Attorney, Agent, or Firm — Leydig, Voit & Mayer, Ltd.

(57) ABSTRACT

A system is provided for computer application code automation comprising a code automation computer server configured for presenting an electronic user interface for receiving user input for generating a Structured Query Language (SQL) query, the user input comprising a plurality of SQL tokens, a processor, associated with the code automation computer server, for receiving the plurality of SQL tokens, the processor retrieving from memory and executing computer executable instructions for at least one of: (a) optimizing performance of the SQL query while receiving the user input, and (b) error checking the SQL query while receiving the user input, wherein the processor is adapted for automatically incorporating the generated SQL query into the computer application code and storing the computer application code in a non-transitory computer readable medium.

26 Claims, 21 Drawing Sheets

(56) References Cited

U.S. PATENT DOCUMENTS

| | | | |
|---|---|---|---|
| 2005/0102284 A1* | 5/2005 | Srinivasan et al. | 707/4 |
| 2006/0004558 A1* | 1/2006 | Bankes | 703/22 |
| 2006/0004693 A1* | 1/2006 | Ramanathan et al. | 707/2 |
| 2006/0200772 A1* | 9/2006 | Dhanapal et al. | 715/760 |
| 2007/0239659 A1* | 10/2007 | Fragapane et al. | 707/2 |
| 2007/0266017 A1* | 11/2007 | Held et al. | 707/4 |
| 2008/0033960 A1 | 2/2008 | Banks et al. | |
| 2008/0120326 A1* | 5/2008 | Kearsey et al. | 707/102 |
| 2008/0301154 A1 | 12/2008 | Vithayathil | |
| 2009/0024940 A1* | 1/2009 | Zeringue et al. | 715/763 |
| 2009/0049022 A1* | 2/2009 | Bender et al. | 707/4 |
| 2009/0077534 A1* | 3/2009 | Peterson | 717/111 |
| 2009/0077535 A1* | 3/2009 | Peterson | 717/113 |
| 2009/0089797 A1 | 4/2009 | Kukreja et al. | |
| 2009/0094216 A1* | 4/2009 | Hou et al. | 707/4 |
| 2009/0144696 A1* | 6/2009 | Andersen | 717/109 |
| 2010/0257576 A1* | 10/2010 | Valente et al. | 726/1 |
| 2010/0293523 A1* | 11/2010 | Ahadian et al. | 717/108 |
| 2010/0332469 A1* | 12/2010 | Tran et al. | 707/736 |

OTHER PUBLICATIONS

Quest Software Incorporated, Article entitled: "Toad® for IBM® DB2®—The Essential Database Management Tool for IBM® DB2®," www.quest.com, Copyright 2008 (2 pages).

Embarcadero Technologies, Article entitled: "Rapid SQL® Database Development," Datasheet, www.embarcadero.com, Copyright 2009 (2 pages).

Ca™ Telon®, Article entitled: "Application Generator r5," Product Brief, Copyright 2007 (5 pages).

Acucorp®, Article entitled: "AcuSQL®—ESQL Precompiler and Runtime Library," extend® 8 Interoperability Suite, Acucorp Technology Datasheet Version 8, www.acucorp.com, Copyright 2007 (6 pages).

International Searching Authority/US, Notification of Transmittal of the International Search Report and the Written Opinion of the International Searching Authority, or the Declaration in International Application No. PCT/US10/58023 (Feb. 9, 2011).

* cited by examiner

```
Create Query | View Query | Execute Query

Test Execute of Query

WHERE EXT_CLAIM.CL_ID = MEDICAL_LINE_ITEM.CL_ID
AND EXT_CLAIM.CL_ID_PREFIX = MEDICAL_LINE_ITEM.CL_ID_PREFIX
AND EXT_CLAIM.CL_ID_SEG_NO = MEDICAL_LINE_ITEM.CL_ID_SEG_NO
AND EXT_CLAIM.CL_ID LIKE 'AAA%'
AND MEDICAL_LINE_ITEM.CL_ID LIKE 'AAA%'
GROUP BY EXT_CLAIM.ABA_NO
       , LEFT(EXT_CLAIM.CBA_CHKACCT_NO,5)
HAVING MAX(EXT_CLAIM.ACMBRH_EFF_DT)
> '0001-01-01'
ORDER BY MAX(EXT_CLAIM.ACMBRH_EFF_DT) ASC
```
— 1602

Input Parameters

Results — 1604

First 200 Rows Returned:
ABA_NO  Column1        Column2
3110020908608   01/01/2008 12:00:00 AM
0               01/01/2008 12:00:00 AM UserID: A815540

Password:

Execute   Reset Query — 1606

Program Inputs

Create Query | View Query | View Component/Code | Execute Query

Program Type:
- ◉ COBOL
  - ◉ Called
  - ○ Stand Alone
- ○ COBOL/CICS
- ○ Java
- ○ C++

Program ID: [          ]

SLA: [ 1.00 ] Seconds

[ Create ] — 1702

Preview of Code

```
***************************************************************
 IDENTIFICATION DIVISION
 PROGRAM-ID.    TESTAAAA.
 DATE-WRITTEN.  09/28/2009 09:34:52 AM
***************************************************************
*THIS PROGRAM IS THE PROPERTY OF AETNA & WAS CREATED USING THE
*AETNA CODE ACCELERATOR TOOL (CAT)
***************************************************************
* APPLICATION NAME: ACAS *
*
* PROGRAM DESCRIPTION: *
*
***************************************************************
 ENVIRONMENT DIVISION.
 CONFIGURATION SECTION.
```

Tabs: Create Query | View Query | View Component/Code | Execute Query

Buttons: Edit Queries (1804) | Add Another Query (1808) | Download (1806) | Cancel/Reset Note: Changes to queries made in Edit Queries or queries added from View Query will be reflected above. Any manual updates made here will be lost.

Saved Queries

EXT_CLAIM 09:50:45 AM — 1904

Main Query EXT_CLAIM 09:50:32 AM — 1906

Up
Down — 1920
Remove

Function: Select
Distinct: False
Cursor:
Cursor Processing:
Fetch: 20
Read: WITH UR Edit — 1922

Views: — 1910
EXT_CLAIM
MEDICAL_LINE_ITEM

Selected Fields: — 1912
EXT_CLAIM.ABA_NO
EXT_CLAIM.ACMBRH_COV_STS_CD
EXT_CLAIM.ACMBRH_EFF_DT
EXT_CLAIM.CBA_CHKACCT_NO

— 1914

AND EXT_CLAIM.CL_ID LIKE
AND MEDICAL_LINE_ITEM.CL_ID LIKE

— 1916

Primary Search:

Secondary Search:

Having:

Group By:

Order By:
EXT_CLAIM.ABA_NO ASC

Query*: — 1918
SELECT EXT_CLAIM.ABA_NO , EXT_CLAIM.ACMBRH_COV_STS_CD
, EXT_CLAIM.ACMBRH_EFF_DT , EXT_CLAIM.CBA_CHKACCT_NO
, MEDICAL_LINE_ITEM.ARL_IQ_CD , MEDICAL_LINE_ITEM.AUTHRCH_CD
FROM GAHFOOD.EXT_CLAIM EXT_CLAIM
, GAHFOOD.MEDICAL_LINE_ITEM MEDICAL_LINE_ITEM
WHERE EXT_CLAIM.CL_ID PREFIX = MEDICAL_LINE_ITEM.CL_ID
AND EXT_CLAIM.CL_ID PREFIX = MEDICAL_LINE_ITEM.CL_ID_PREFIX
AND EXT_CLAIM.CL_ID_SEG_NO = MEDICAL_LINE_ITEM.CL_ID_SEG_NO Create Query | View Query | View Component/Code | Edit Queries — 1902

FIG. 19

SYSTEM AND METHOD FOR CODE AUTOMATION

CROSS-REFERENCE TO RELATED APPLICATIONS

This patent application claims the benefit of U.S. Provisional Patent Application No. 61/296,737 filed Jan. 20, 2010, which is incorporated herein by reference in its entirety, including without limitation all drawings and figures therein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to the field of enterprise management and more specifically to the area of computer application development.

BACKGROUND OF THE INVENTION

Computer databases employ a programming language, called a Structured Query Language (SQL), to programmatically interface with users and external computer applications via SQL queries, including data input, output, and numerous logical search functions. Due to the complexity of the SQL syntax, database programming requires special knowledge and training. However, as necessity for database access and interface continues to increase, a wide variety of users with different levels of programming skills need to have access and basic ability to perform database programming by implementing SQL queries.

User interface based SQL editors attempt to address the issue of simplifying the query building process. However, existing solutions merely collect user input without attempting to guide the user in optimizing query performance during the query construction process. Hence, the user has to complete multiple iterations of the query building process and test various query construction scenarios in order to eliminate mistakes and optimize performance. Even in case of experienced users, this increases the development cost and lengthens the development cycle and can be a daunting task for users with little or no knowledge of database management systems (DBMS) and SQL. The foregoing problems are exacerbated when the resulting SQL query is manually incorporated into external application code where additional sources of error may be introduced. Further sources of error may be introduced when changes need to be made to the SQL queries manually incorporated into the external application code.

BRIEF SUMMARY OF THE INVENTION

Embodiments of the invention are used to provide a computer implemented system and method for code automation, including computer readable medium having stored thereon computer executable instructions comprising a development tool that allows a user to quickly create Structured Query Language (SQL) queries without a database management system (DBMS) platform knowledge, guarantees high performance and seamless integration into a program with all error handling, retry logic, and standardization included. The Code Automation Tool (CAT) described herein reduces the percentage of SQL code that requires modification to prevent production performance issues, reduces the number of coding error defects, and increases the speed of developing and modifying computer application programs, such as COBOL/DB2 programs, as well as COBOL/CICS, JAVA, and C++ programs and the like. Embodiments of the CAT tool create SQL code based on user input while concurrently performing SQL performance and error checks as the SQL code is being created. Upon creating the SQL code, embodiments of the CAT tool automatically generate application program code (e.g., COBOL code) with the created SQL calls and all appropriate error handling, retry logic, as well as any required COBOL/DB2 definitions.

In one aspect of the invention, a system is provided for computer application code automation comprising a code automation computer server configured for presenting an electronic user interface for receiving user input for generating a Structured Query Language (SQL) query, the user input comprising a plurality of SQL tokens, a processor, associated with the code automation computer server, for receiving the plurality of SQL tokens, the processor retrieving from memory and executing computer executable instructions for at least one of: (a) optimizing performance of the SQL query while receiving the user input, and (b) error checking the SQL query while receiving the user input, wherein the processor is adapted for automatically incorporating the generated SQL query into the computer application code and storing the computer application code in a non-transitory computer readable medium.

In another aspect of the invention, a method is provided for computer application code automation comprising receiving, via an electronic user interface presented by a code automation computer server, user input for generating a Structured Query Language (SQL) query, the user input comprising a plurality of SQL tokens, executing, via a processor associated with the code automation computer server and connected to computer readable memory initialized with an application code development environment, computer executable instructions for at least one of: (a) optimizing performance of the SQL query while receiving the user input, and (b) error checking the SQL query while receiving the user input, and automatically incorporating the generated SQL query into the computer application code and storing the computer application code in the computer readable memory.

In yet another aspect of the invention, a non-transitory computer readable medium is provided having stored thereon computer executable instructions for computer application code automation, the instructions comprising receiving user input for generating a Structured Query Language (SQL) query, the user input comprising a plurality of SQL tokens, the instructions further comprising at least one of: (a) optimizing performance of the SQL query while receiving the user input, and (b) error checking the SQL query while receiving the user input, and automatically incorporating the generated SQL query into the computer application code.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 7 is a diagram illustrating an index search screen of the CAT tool, as contemplated by an embodiment of the invention;

FIG. 9 is a diagram illustrating a secondary search screen of the CAT tool, as contemplated by an embodiment of the invention;

FIG. 10 is a diagram illustrating a group by/having screen of the CAT tool, as contemplated by an embodiment of the invention;

FIG. 12 is a diagram illustrating a cursor processing screen of the CAT tool, as contemplated by an embodiment of the invention;

FIG. 13 is a diagram illustrating a preview of query screen of the CAT tool, as contemplated by an embodiment of the invention;

FIG. 16 is a diagram illustrating another embodiment of a test execute of query screen;

FIG. 17 is a diagram illustrating a program inputs screen of the CAT tool, as contemplated by an embodiment of the invention;

FIG. 18 is a diagram illustrating a preview of code screen of the CAT tool, as contemplated by an embodiment of the invention;

FIG. 19 is a diagram illustrating a saved queries screen of the CAT tool, as contemplated by an embodiment of the invention.

DETAILED DESCRIPTION

The following examples further illustrate the invention but, of course, should not be construed as in any way limiting its scope.

Figure 1:
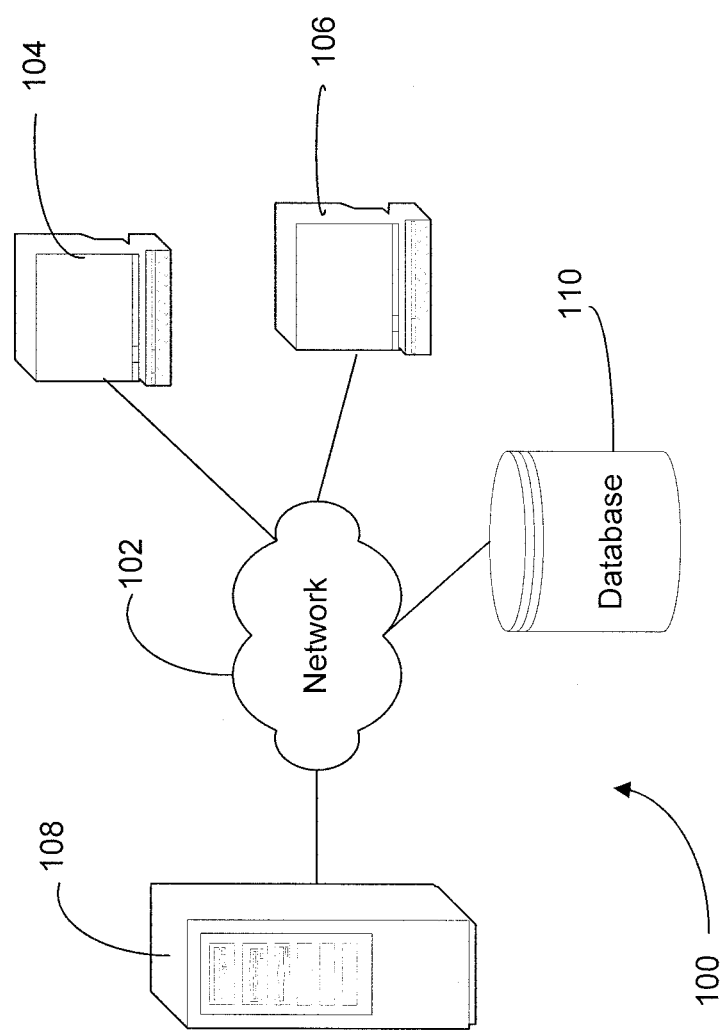
FIG. 1 is a diagram illustrating a computer system environment for implementing a Code Automation Tool (CAT), as contemplated by an embodiment of the present invention.

Turning to FIG. 1, an embodiment of a computer system environment for implementing the code automation tool described herein is shown. The system 100 includes a network 102, such as a Local Area Network (LAN), a Wide Area Network (WAN), an Internet network, or the like, connecting a plurality of client computers 104, 106 and one or more code automation computer servers 108 with a relational database 110. In an embodiment, the relational database 110 further includes one or more special purpose database server computers for implementing a database environment, such as an IBM DB2 data server platform, or the like. The client computers 104, 106 and/or the server computer 108 include non-transitory computer readable media, such as hard drives, flash drives, or the like, that store computer executable instructions comprising the Code Automation Tool (CAT) described in further detail below. Preferably, the CAT tool includes a web-based interface that notifies the developer of possible performance issues while a Structured Query Language (SQL) query is being developed rather than after it is created. In an embodiment, the CAT tool also automatically creates a Common Business-Oriented Language (COBOL) program with the created SQL calls, as well as all appropriate error handling, retry logic, and required COBOL/DB2 definitions. While the embodiment of the computer environment shown in FIG. 1 is depicted with respect to a distributed network environment, those skilled in the art will realize that the Code Automation Tool described herein is not limited to a distributed network implementation and may also be implemented via a single special purpose computer.

In one embodiment, the CAT tool notifies the user of performance issues with excessive sorting during SQL creation. Once the SQL has been created, the tool includes the ability to execute the generated SQL, add the SQL into a COBOL program and automatically add all appropriate host variables for NULL indicators, search criteria, declaration generators (DCLGENs), error handling, retry logic based on user entered Service Level Agreement value, and cursor variables. Along with these variable definitions, the CAT tool also automatically includes code to handle cursor processing. The CAT tool allows modification of the generated SQL code and automatically updates the modified SQL in the COBOL program. This eliminates the need for again having to undergo the entire process of SQL and COBOL code generation.

Figure 2:
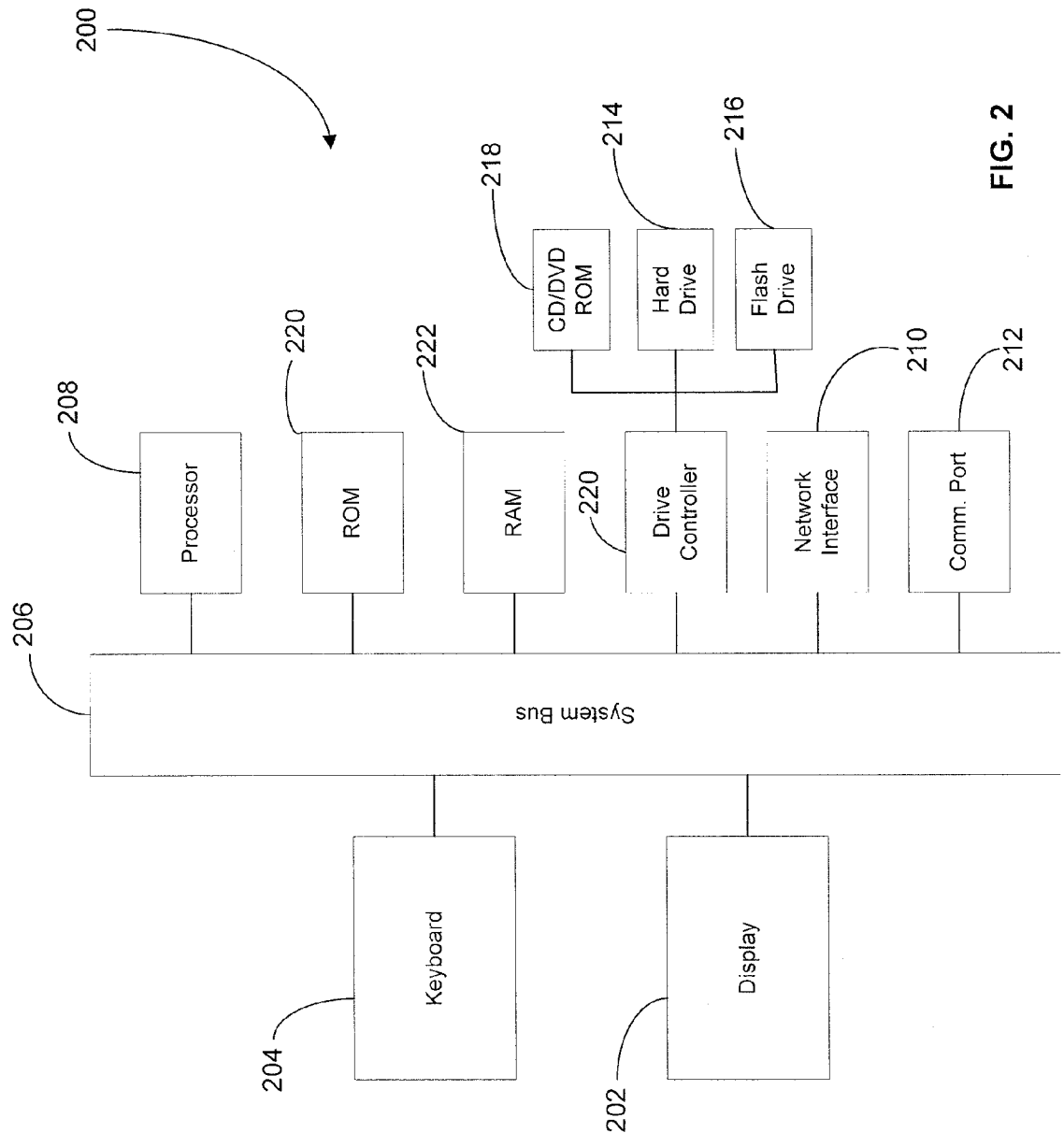
FIG. 2 is a diagram illustrating a computer device, such as a code automation computer server of FIG. 1, as contemplated by an embodiment of the invention.

Turning to FIG. 2, an embodiment of a computer device of FIG. 1 is shown. The computer 200 includes a plurality of hardware elements, including a display 202 for presenting to the user a user interface of the CAT tool described herein, as well as keyboard 204 for relaying the user input. The display 202 and keyboard 204 peripherals connect to the system bus 206. The central processing unit (CPU) 208 executes the computer executable instructions comprising the CAT development tool. In embodiments, the computer executable instructions are received over a network interface 210 (or communications port 212) or are locally stored and accessed from a non-transitory computer readable medium, such as the hard drive 214, flash (solid state) memory drive 216, CD/DVD ROM drive 218, or the like. The computer readable media 214-218 are accessible via the drive controller 220. Read Only Memory (ROM) 222 includes computer executable instructions for initializing the processor 208, while the Random Access Memory (RAM) 224 is the main memory for loading and processing instructions executed by the CPU 208.

Turning to FIGS. 3-19, an embodiment of the Code Automation Tool (CAT) is shown in further detail. In the illustrated embodiment, the CAT tool includes a web-based interface that notifies the developer of possible syntax error and query performance issues concurrently with accepting user input for building an SQL query. Upon facilitating the creation of the SQL query based on the collected user input and subject to the real-time syntax error and query performance optimization, the CAT tool is further capable of automatically creating a Common Business-Oriented Language (COBOL) program with the created SQL calls, including all appropriate error handling, retry logic, and required COBOL/DB2 definitions. Those skilled in the art will realize that further embodiments include automatic incorporation of the created SQL query into programs created via programming languages other than COBOL, such as Java, C++, or the like. The CAT tool includes a plurality of user interface screens for receiving user input for building high performing and error-free SQL queries without the need for the user to possess an advanced knowledge of a database management system.

Figure 3:
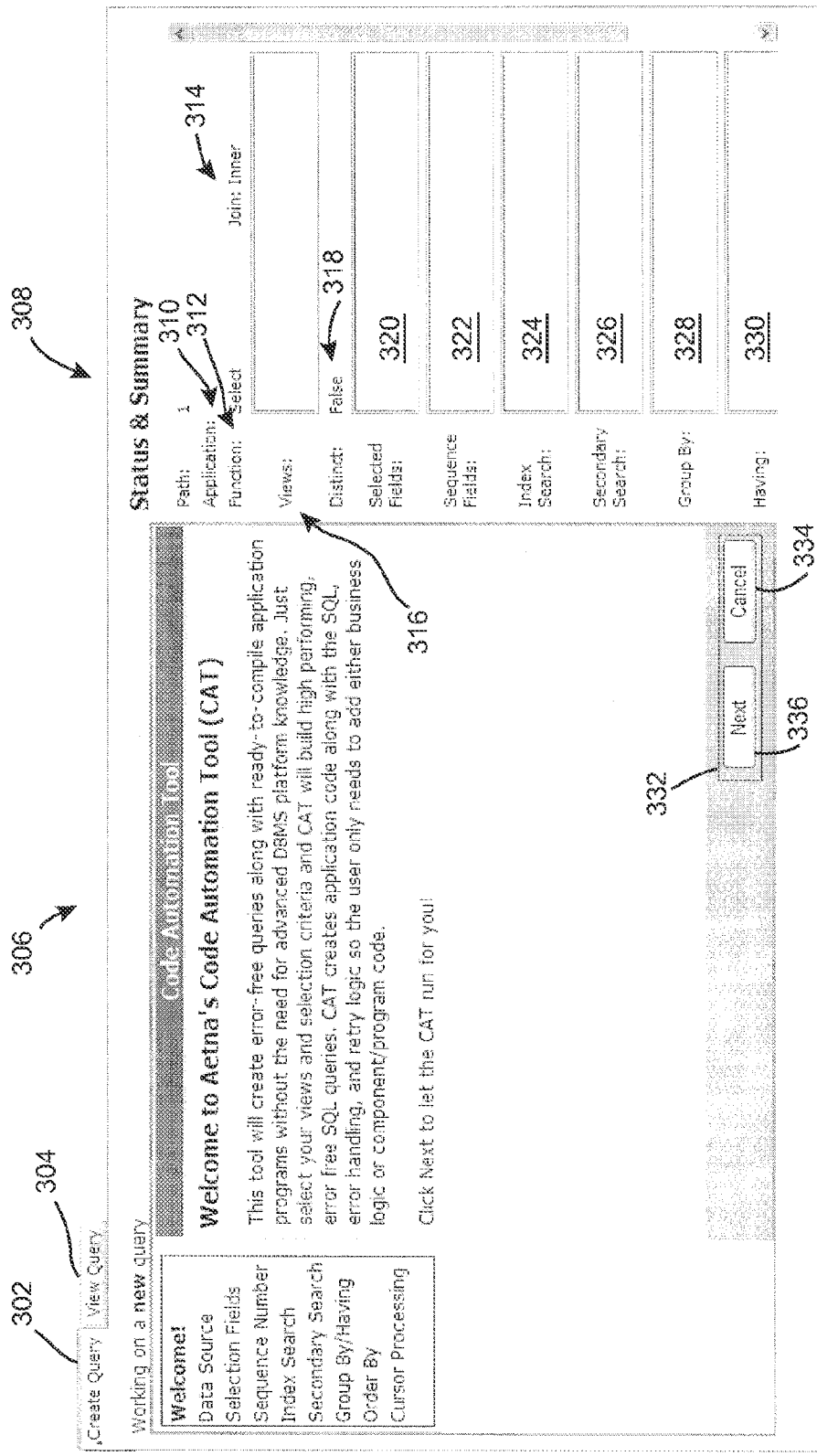
FIG. 3 is a diagram illustrating a welcome screen of the CAT tool, as contemplated by an embodiment of the invention.

With reference to FIG. 3, the welcome screen 300 includes a Create Query tab 302 and a View Query tab 304 for respectively creating and viewing an SQL query. Preferably, the user is able to view the query syntax during and after its creation. The wizard menu 306 provides the user with a visual indication as to which stage in the query building process the user is currently in by highlighting the name corresponding to the current stage. The wizard menu 306 comprises a plurality of links, such as HTML links, which allow the user to jump to any of the displayed query building stages. The status and summary panel 308 provides the user with a display of various SQL tokens involved in the query under construction as the user is moving through the query building process. For instance, the Status and Summary area 308 may display an application (e.g., database) 310, SQL function type (query type) 312, joint type 314, SQL views 316 to query, DISTINCT indicator 318 for returning unique results, database fields 320 to select, sequence fields 322, index search fields 324, secondary search fields 326, GROUP BY clause fields 328, and HAVING clause fields 330. The navigation area 332 includes navigation controls for moving between the query building screens, including a "Cancel" control 334 for resetting the current and saved queries. To start building a query, the user clicks on the "Next" button control 336. During the query building process, the user is able to see the current query by clicking the View Query tab 304.

Figure 4:
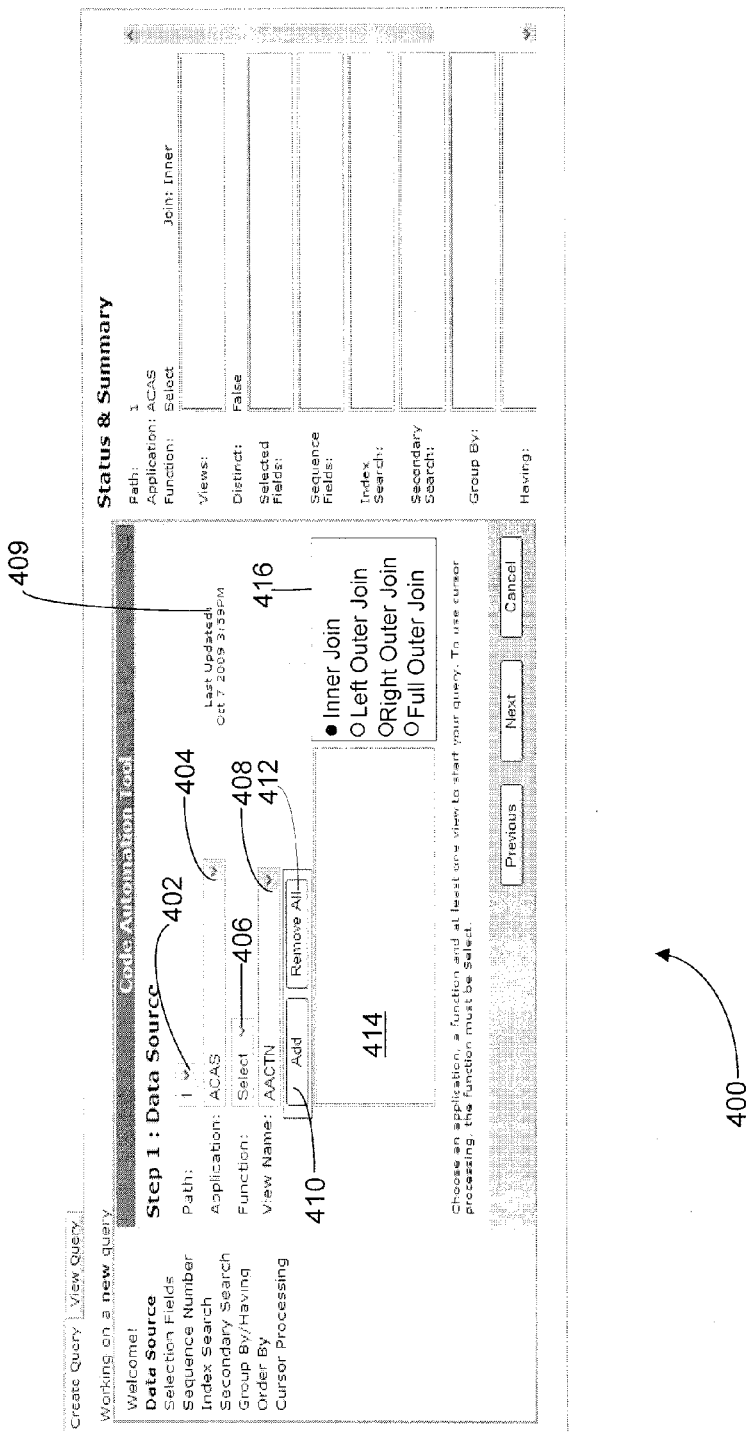
FIG. 4 is a diagram illustrating a data source screen of the CAT tool, as contemplated by an embodiment of the invention.

Turning to FIG. 4, the Data Source screen 400 includes a plurality of dropdown selection lists for specifying the source of data from which the query is being built. For instance, to initiate the query construction, the user selects a development path, an application, a desired SQL function for the current query (e.g., "Select"), as well as the view name from respective drop down lists 402-408. The data source screen 400 further provides an indicator 409 as to the date when the selected application was last updated. The "Add" and Remove All" button controls 410, 412 respectively add and remove the selected information to and from the list box 414. To specify the type of Join for the query, the user selects one of the Join type radio buttons from the selection area 416.

The Last Updated Date indicator 409 displays the last time a refresh of the DB2 catalog information was brought down to the CAT's meta data repository. This indicates the currency of the database information for which the user is building a query. The Meta data is refreshed according to a pre-defined schedule determined by the application manager and can also be updated at any time. To select a view, the user clicks on the View Name list box 408. Once focus is on the view name list box 408, searching is available by keying in letters. This makes it quicker to search for a specific view name. In this example, typing "med" brings the user to the first view that begins with "med." The search function is refreshed when the focus is taken off of this list box (e.g., by clicking on another button or anywhere on the screen). For Delete, Insert, and Update queries, only 1 view can be selected Specifying Other Views to Join or Select Data From Other views that have a relationship to any of the selected views will be listed in the view name list box. Preferably, only views that have a parent-child or grandparent-child, or parent-grandchild relationship are listed. Selecting the view and clicking on the Add button 410 adds the selected view to the selected list box 414. In an embodiment, up to 10 view names can be selected to have data retrieved from. Preferably, to remove previously selected view names from the selected list box 414, all views must be removed by clicking on the Remove All button 412. All views are removed so as to guarantee all views have a valid relationship. Once all required views have been selected, the user clicks on "Next" button at the bottom of the screen to continue. If the view selected is a grand-parent or grand-child relationship, the intermediary view will automatically be added to the selected list box so that the join of the views can be done.

Specifying Join Type

The Join type for a Select query is specified via a plurality of radio buttons in the join type selection area 416. An Inner Join is set by default. The Outer Joins (Left, Right, Full) can only be chosen when two tables are specified in the Selected View list box 408. When three or more tables are specified, the Join option automatically is set to Inner. When two tables are selected, the CAT tool allows the user to choose the type of Join by clicking on the appropriate radio button. The first table in the list is considered to be the Left table. When one table or more than two tables are specified, the Join radio buttons are disabled and an Inner Join is the only option. To further facilitate the automatic incorporation of the created SQL query into a COBOL application code, the CAT tool creates all appropriate Null indicator fields for each type of Outer Join involved.

Figure 5:
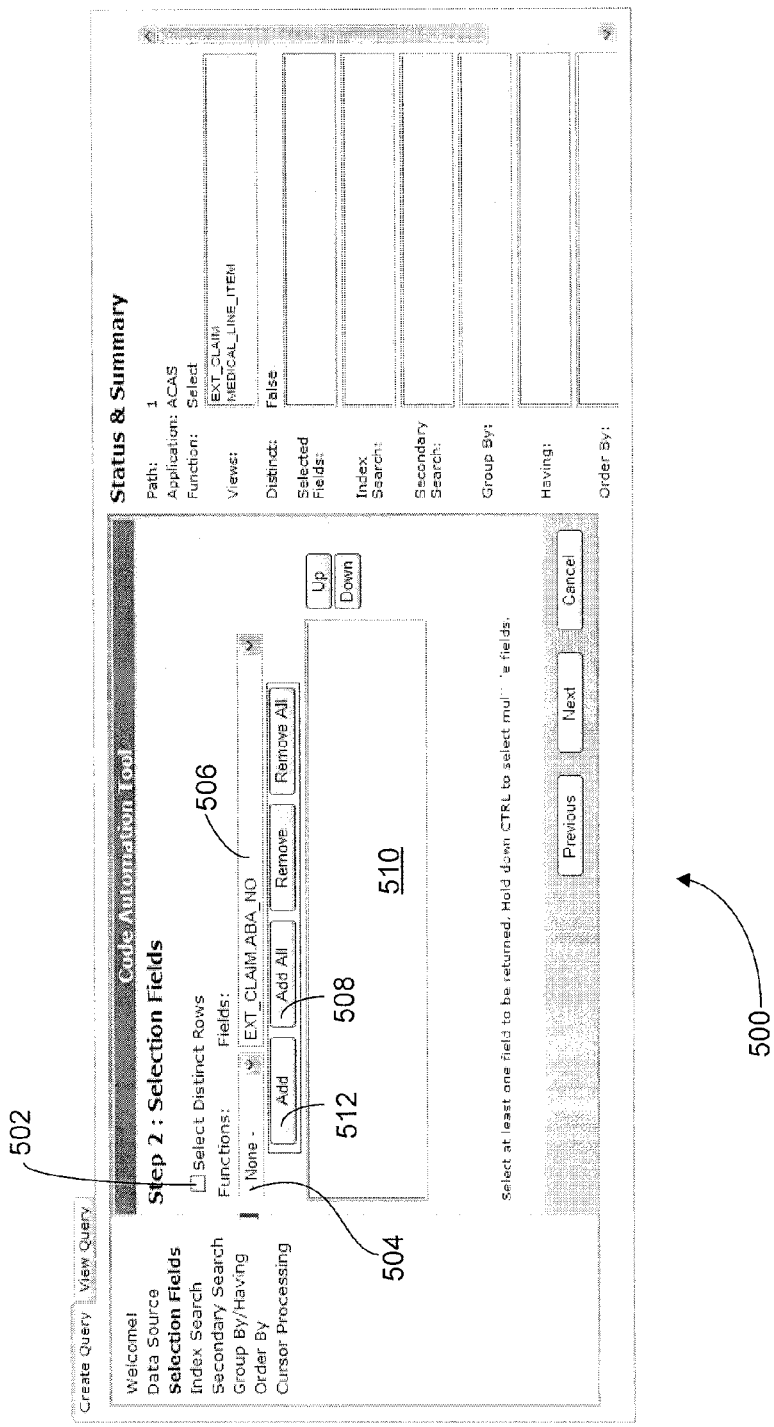
FIG. 5 is a diagram illustrating a selection fields screen of the CAT tool, as contemplated by an embodiment of the invention.

As illustrated in FIG. 5, progressing to the selection fields screen 500 allows the user to indicate, via controls 502-506, whether distinct rows should be selected for the query result, and to select a column function and a column field for the query. For Select queries, at least one column must be selected. Furthermore, in case of building a Select query, the user can choose to have only distinct rows returned by clicking on the DISTINCT query option check box 502. This selection will be valid for all columns in the query. To select the columns to be included in the query, the user selects column names from the Field list box 506. If no functions will be required for any of the columns, the user can select all of the columns to be included in the query by clicking on the Add All button 508. All columns from the views selected from the previous screen will be displayed in the Selected Column list box 510.

If a column function is required, the user selects the appropriate function to be associated with that column from the Column Function list box 504. If no function is required, the Column Function list box 504 is set to "None". Clicking on the Add button 512 adds the column (and corresponding function, if requested) to the Selected Column list box 510.

Figure 6:
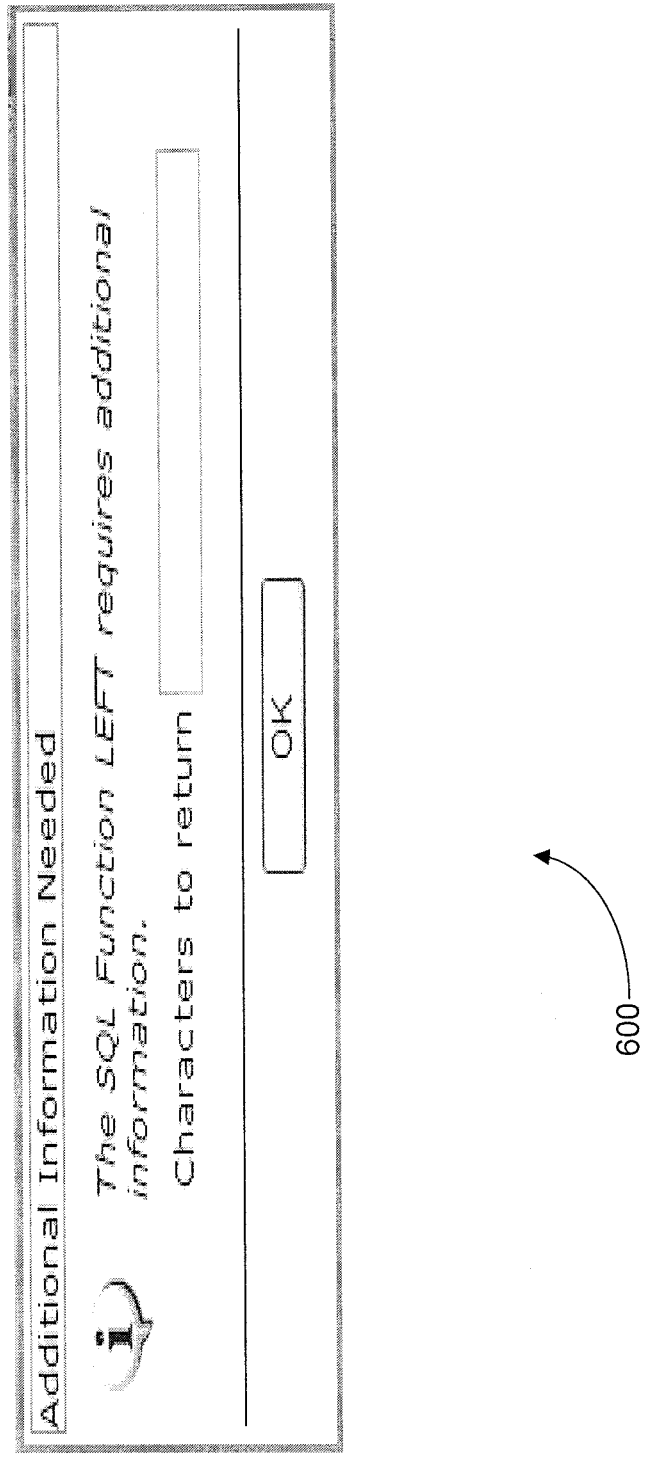
FIG. 6 is a diagram illustrating a real-time prompt for user input in connection with edit/error checking that takes place concurrent with receiving various SQL tokens and functions via the user interface of the CAT tool, as contemplated by an embodiment of the invention.

To provide real-time SQL edit/error checking concurrent with receiving input of various SQL functions, when the user selects the Add button 512, depending on the function selected, an input box is displayed requesting a corresponding value for the selected function. For example, if the LEFT function is chosen, the input box 600 of FIG. 6 is displayed requesting a value for the characters that need to be returned by this function. When a valid value is entered, the Selected Column list box 510 shows the column and corresponding function. The status of the options chosen for the query is displayed on the Status & Summary panel 514 on the right side of the screen.

Column Function Edit Checks

In one embodiment, the following edit checks are performed when a function is selected to be associated with a column:

(a) Aggregate function and column data type must be valid;
(b) Date function and column data type must be valid;
(c) Time function and column data type must be valid;
(d) String function and column data type must be valid; and
(e) No more than 20 non-function columns can be specified when a function is associated with another column.

Figure 7:
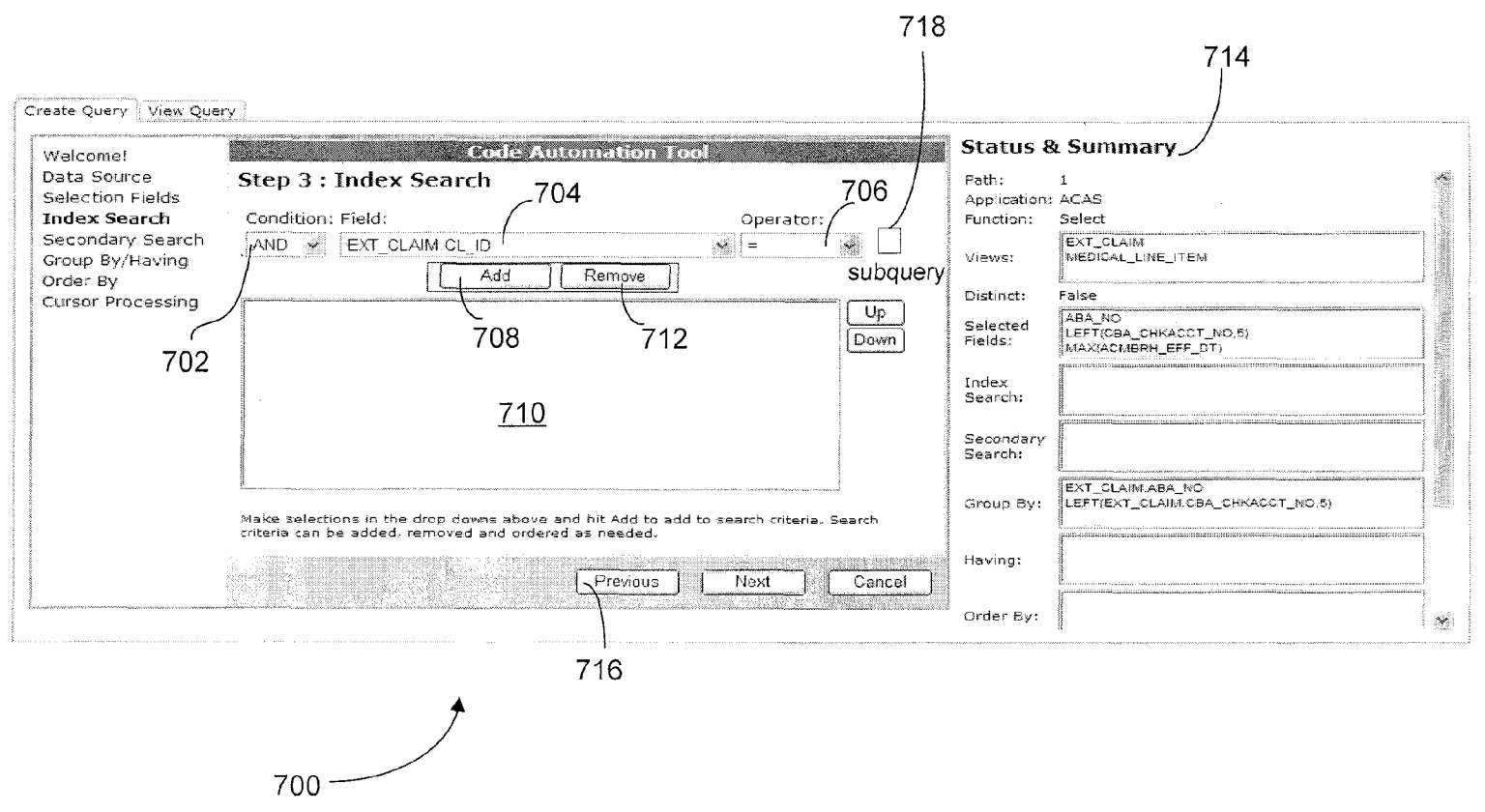

Turning to FIG. 7, an embodiment of an Index Search screen 700 is shown. Preferably, all queries, except for Insert type queries, should have Index access to insure optimal query performance. Columns selected from this screen appear in the WHERE portion of the SQL statement. The Condition dropdown list 702 allows the user to select either an "AND" or an "OR" condition. Only columns that are part of an existing index are listed in the Field dropdown 704. Selecting a field is done by clicking on the name of the column which will then be highlighted. A column Operator must be chosen from the Operator dropdown 706 as this will determine the type of compare that will be performed for the column. When the user clicks on the Add button 708, the Condition, Column Name, and Operator selections are added to the Selected Column list box 710. Conversely, to remove a column from the Selected Column list box 710, the user highlights the desired column(s) and clicks the Remove button 712.

The status of the options chosen for this query is displayed on the Status & Summary panel 714 on the right side of the screen. To change any of these values displayed in the panel 714, the user clicks on the "Previous" navigation button 716 and modifies the desired value on the appropriate screen 300, 400, 500.

Index Search Performance Checks

In an embodiment, the following performance checks are performed for columns selected to be part of the index search.

(a) At least 1 column should be selected to prevent a Tablespace Scan;
(b) Non-matching Index Scan check;
(c) When more than one view is selected (e.g., a join is being done) and a selected indexed column is in more than one view, a warning is displayed to include the indexed column from the other view.

Figure 8:
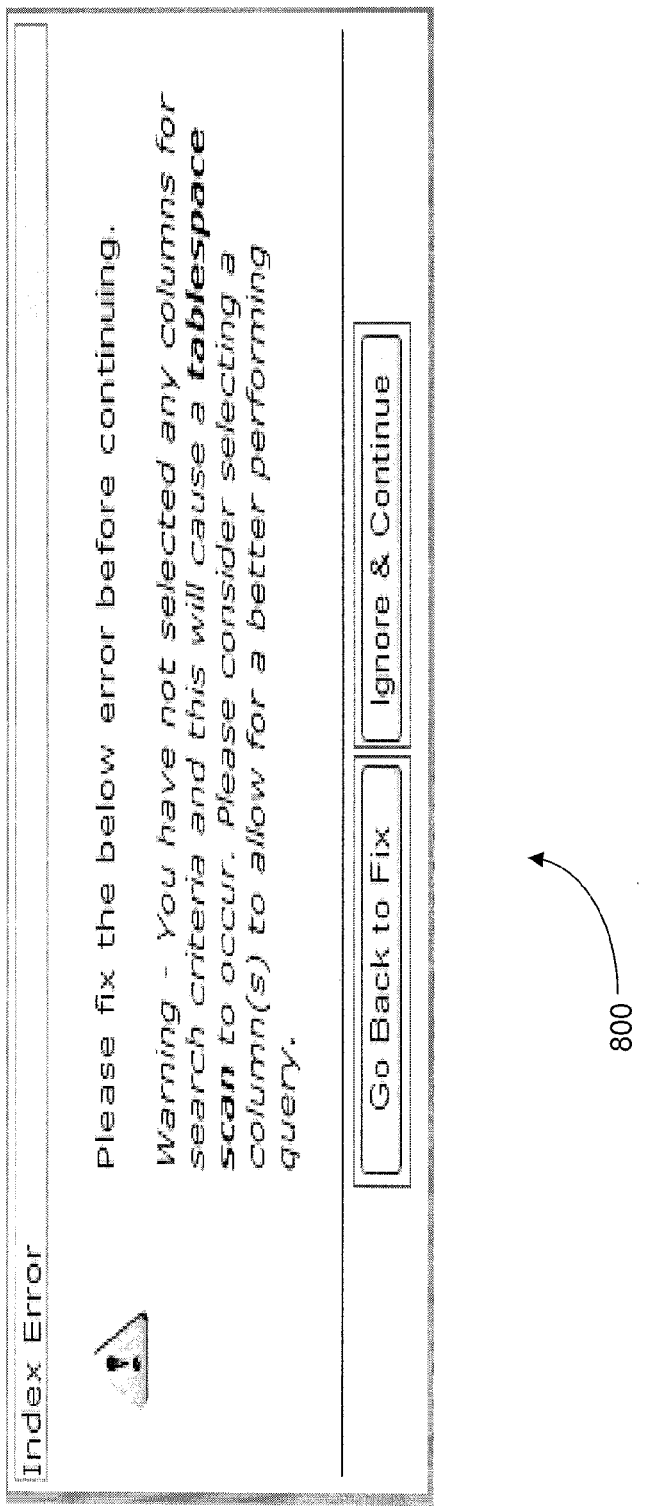
FIG. 8 is a diagram illustrating a real time-prompt suggesting modifications to SQL token(s) supplied by the user so as to improve query performance, as contemplated by an embodiment of the invention.
Figure 11:
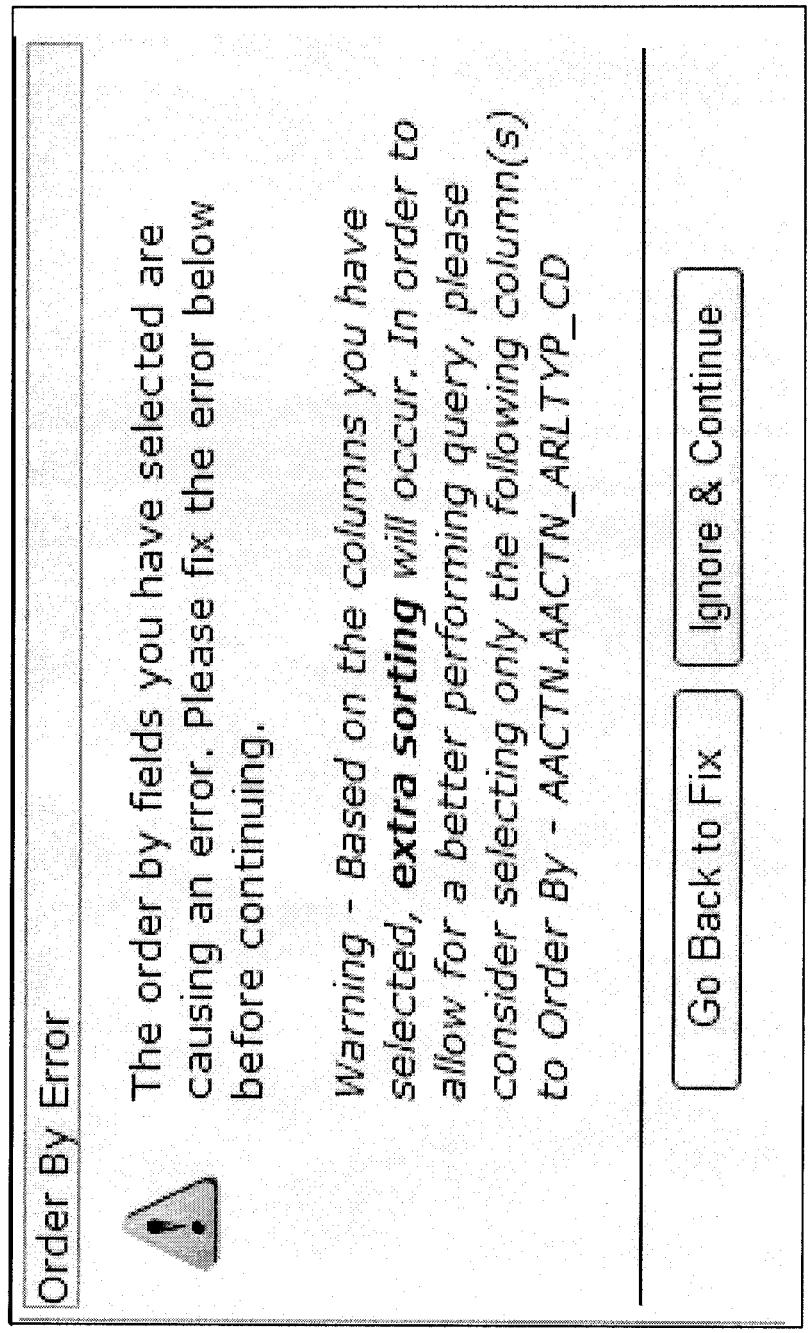
FIG. 11A is a diagram illustrating an order by screen of the CAT tool, as contemplated by an embodiment of the invention.
FIG. 11B is a diagram illustrating an Order By Performance Check warning, as contemplated by an embodiment of the invention.

As illustrated in FIG. 8, if there is a possible error or a query performance problem (for example, a Tablespace Scan or Non-matching Index Scan), the CAT tool automatically presents the user with a pop up warning 800 setting forth the source of an error or performance problem with the current query configuration. Preferably, the warning indicator 800 is generated in real-time and further includes a suggested modification to the SQL token supplied by the user in order to improve final query performance. The warning indicator 800 includes options to go back to the Index Search step and change query selections, or to ignore the error and continue on to the next step.

Secondary Search Screen

Figure 9:
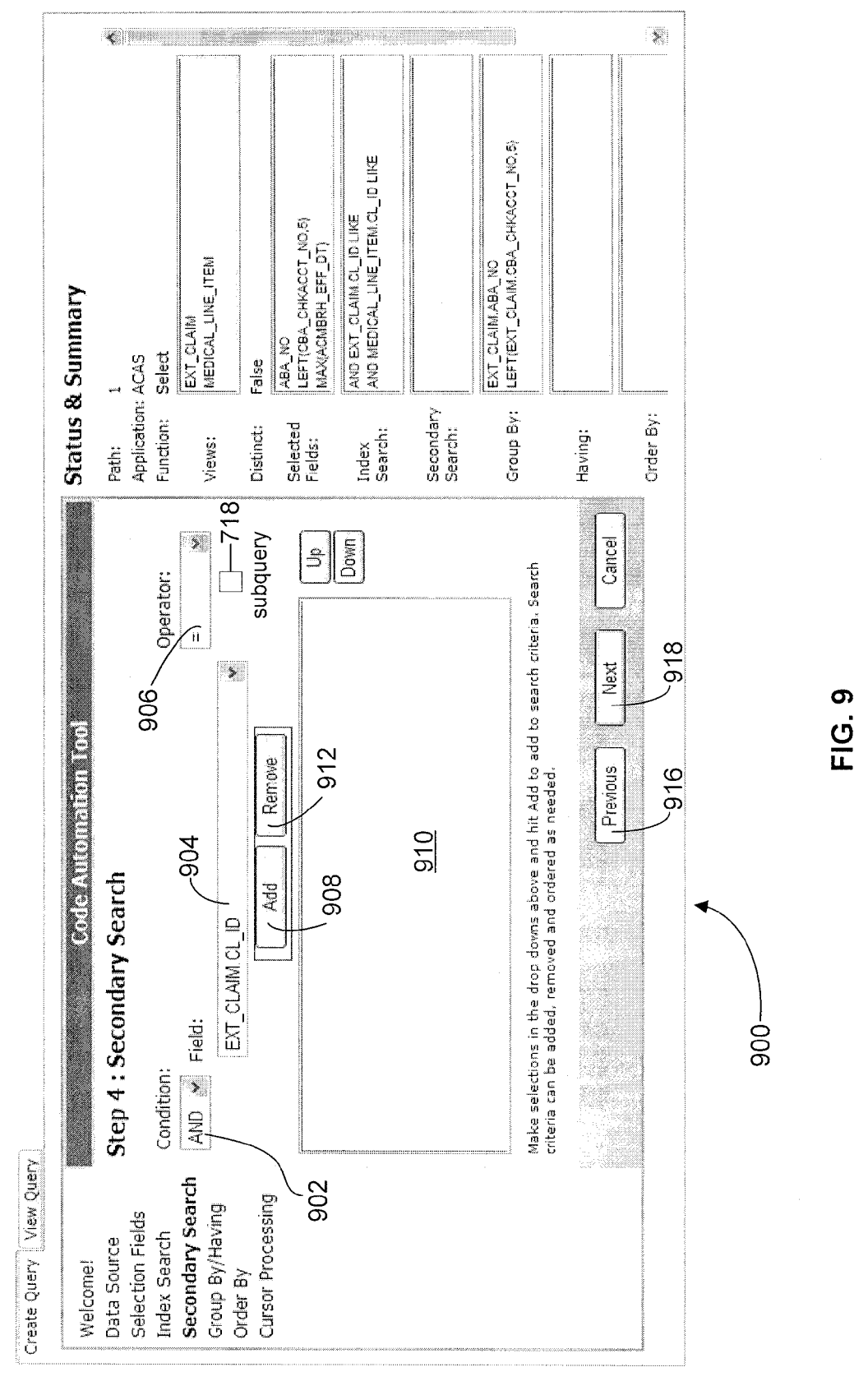

Turning to FIG. 9, an embodiment of a secondary search screen 900 is shown. In an embodiment, all queries (except for Insert) can also specify other search criteria comprising any column included in the view. Columns selected from this screen also appear in the WHERE portion of the SQL statement. A user selects either an "AND" or an "OR" condition from the Condition dropdown box 902. Only columns that are part of an existing index are listed in the Field dropdown box 904. Selecting a field is done by clicking on the name of the column which will then be highlighted. A column Operator must be chosen from the Operator dropdown box 906 in order to determine the type of compare to perform for the column. Clicking on the Add button 908 adds the Condition, Column Name, and Operator to the Selected Column list box 910. To remove a column from the Selected Column list box, highlight the column(s) and click the Remove button 912. Column order can be changed by highlighting the column in the Selected Column list box 910 and clicking on either the Up or Down buttons 914.

The status of the options chosen for this query is displayed on the Status & Summary panel on the right side of the screen. Preferably, the fields in the Status & Summary panel cannot be directly modified. To change any of these values, the user clicks on the "Previous" navigation button 916 at the bottom of the screen and modifies the value on the appropriate screen. Clicking on Next navigation button 918 at the bottom of the screen advances to the next screen.

Group by/having Screen

Figure 10:
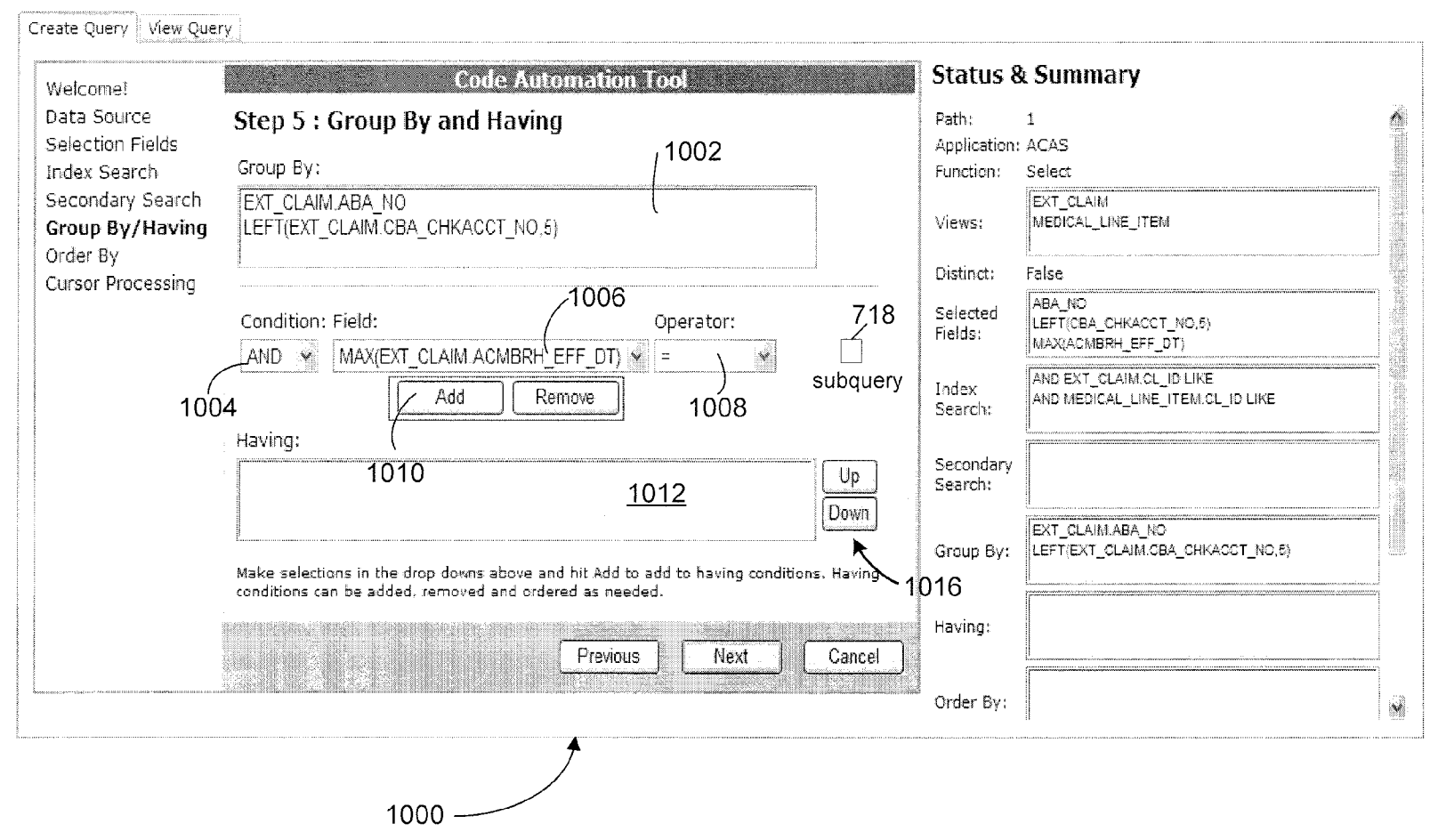

Turning to FIG. 10, an embodiment of the Group By/Having Screen 1000 of the CAT development system is shown. Preferably, the Group By/Having screen is displayed only when an aggregate SQL function (such as AVG, COUNT, MAX, MIN, or SUM) is chosen on the Selection Fields screen. The columns listed in the Group By list box 1002 are automatically derived based on the columns with aggregate functions. "Having" SQL modifier fields are included in the query based on column/function chosen from the Selection field screen. These fields are included in the HAVING part of the query. Condition dropdown box 1002 allows the user to select either an "AND" or an "OR" condition.

As part of real-time error processing, preferably only columns/functions that are valid (e.g., based upon user selections made in prior screens) are listed in the Field dropdown box 1006 thereby preventing user selection of invalid query components during the query building process. Selecting a field is done by clicking on the name of the column which will then be highlighted. User selection of a column Operator from the Operator dropdown 1008 determines the type of compare that is performed for the column. The Add button 1010 adds the Condition, Column Name, and Operator to the Selected Column list box 1012. To remove a column from the Selected Column list box 1012, the user highlight the column(s) and clicks the Remove button 1014. Column order can be changed by highlighting the column in the Selected Column list box 1012 and clicking on either the Up or Down buttons 1016. The status of the options chosen for this query is also displayed in the Status & Summary panel on the right side of the screen. To change the values displayed in the Status and Summary paten, the user must click on the "Previous" navigation button 1018 and modify the value on the appropriate screen, while the Next navigation button 1020 advances to the next screen.

Order by Screen

Turning to FIG. 11A, an embodiment of the Order By Screen 1100 of the CAT development system is shown. The Code Automation Tool identifies the columns that are available to be included in an Order By clause in the Field dropdown 1102. The Code Automation Tool applies SQL syntax rules to the user selections in previous screens to determine in real-time whether aggregate functions were selected in order to identify which fields are available to be ordered on. Selecting a field is done by clicking on the name of the column from the Field dropdown 1102, which will then be highlighted. Radio buttons 1104 allow the user to select either an ascending or a descending order for the Order By function. Add and Remove buttons 1108, 1108 respectively add and remove the Column Name, and Ordering to the Order By list box 1110. The column order position is changed via Up and Down buttons 1112. The Next navigation button 1114 advances the query construction to the next screen.

Order by Performance Checks

In an embodiment, the following performance check is performed for columns selected to be part of the Order By statement:

When a column is selected that is not part of the index access, a warning message is displayed with the appropriate column(s) to reduce extra sorting, as shown in FIG. 11B.

Cursor Processing Screen

Figure 12:
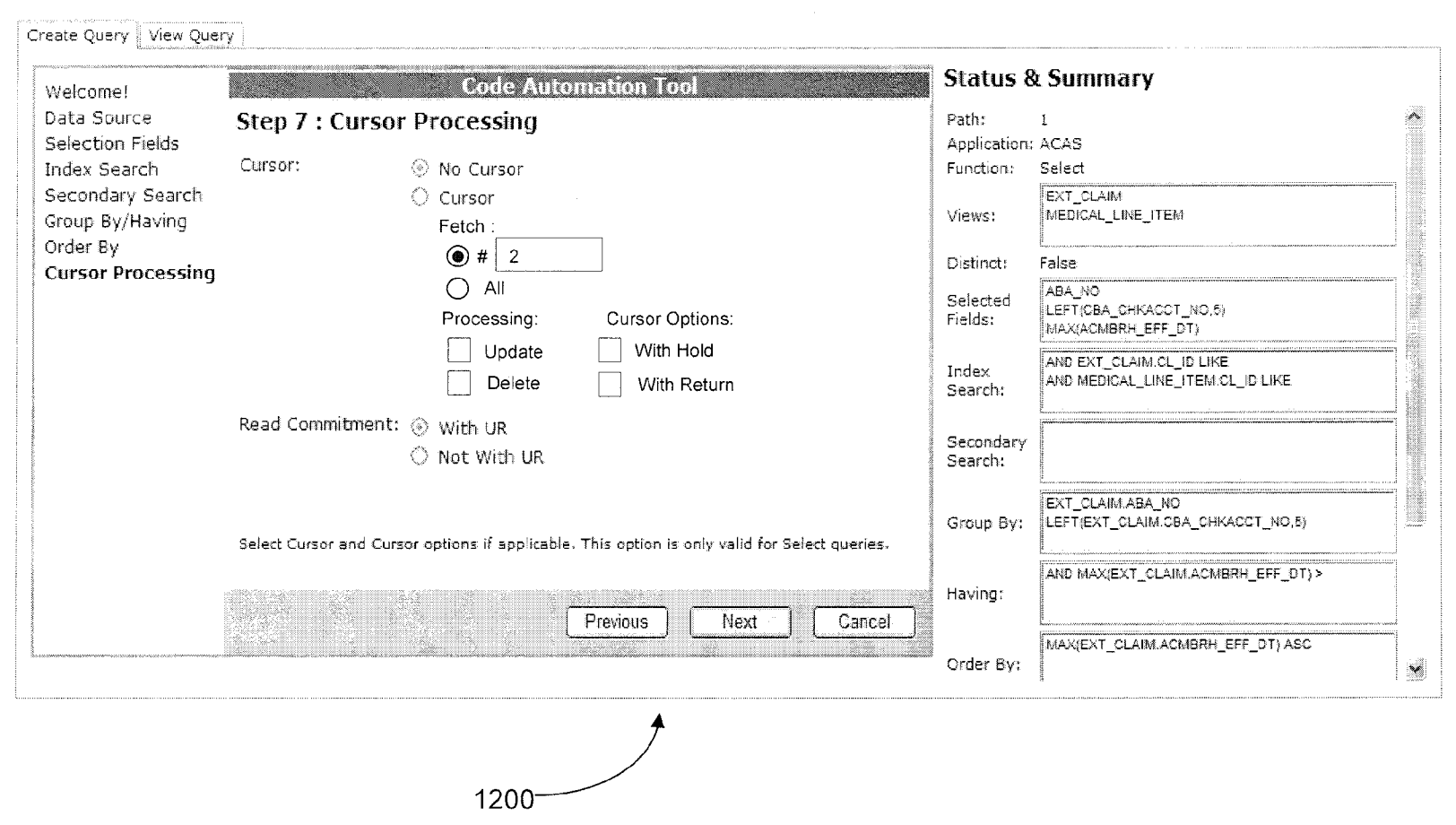

Turning to FIG. 12, an embodiment of the Cursor Processing Screen 1200 of the Code Automation Tool is shown. For queries containing Select statements, either a SELECT . . . INTO type query or a Cursor can be chosen. In an embodiment, this option affects the queries that are created in a COBOL program. Either WITH UR or NOT WITH UR can be chosen (where the CAT tool automatically limits the user to NOT WITH UR as the only option when an Insert Update, or Delete statement is being constructed).

When a Cursor is selected by clicking on the Cursor option radio button 1202, the remaining cursor processing options become active. The user selects the number of rows to return for the cursor by either entering a value 1204 or selecting "All". In an embodiment, availability of the option to add an Update and/or Delete Cursor depends on whether a function was included with the columns selected on the Selection Fields screen 500 (FIG. 5). The screen 1200 further provides the user with additional options 1206, such as to specify cursor processing With Hold and/or With Return, among others.

Preview of Query Screen

Figure 13:
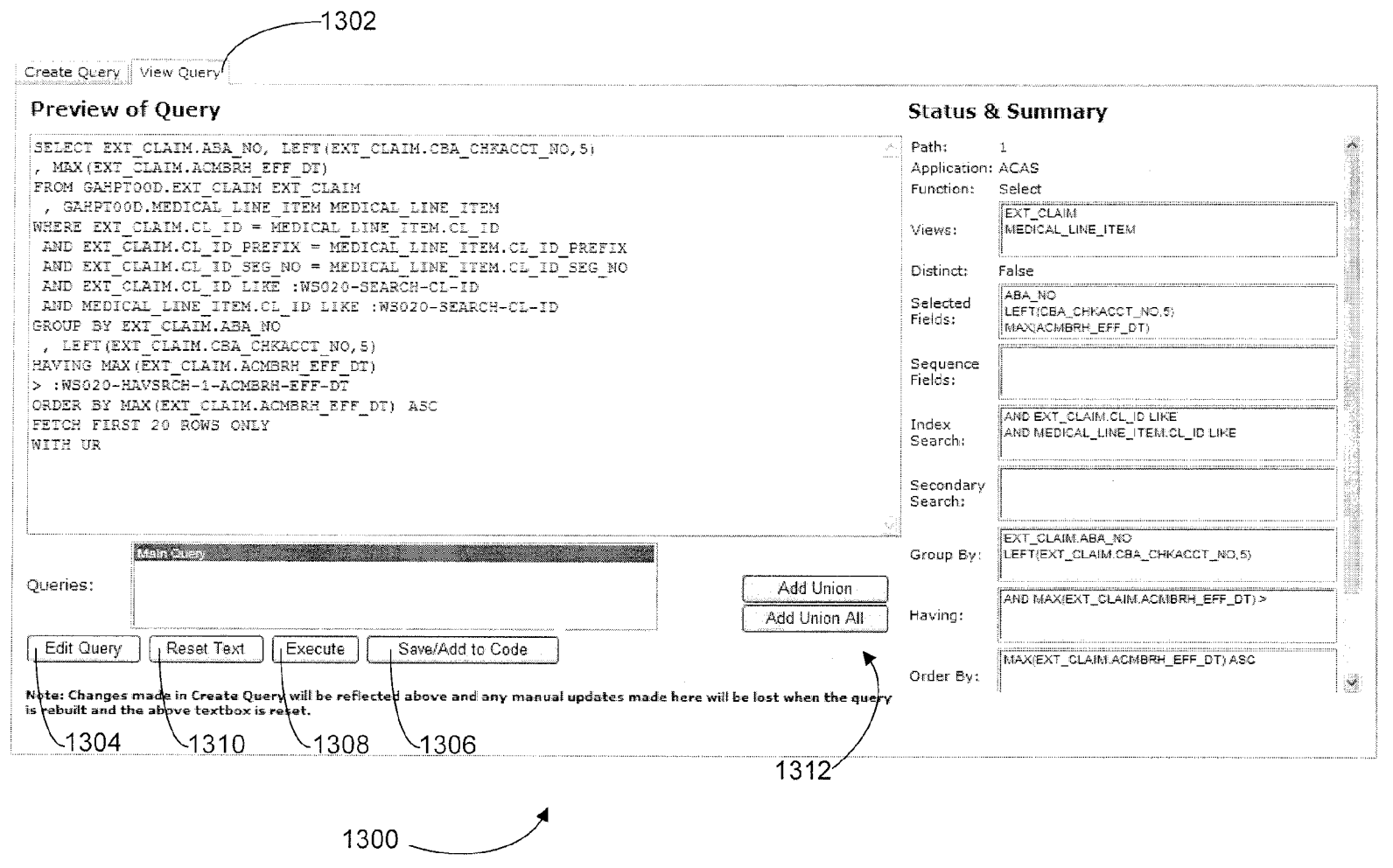

Turning to FIG. 13, an embodiment of the Preview Query Interface Screen 1300 is shown. Once the user specifies the query creation criteria via the screens 400-1200, a resulting SQL query may be previewed by selecting the View Query tab 1302. The query can be edited from here directly in the SQL format by clicking on the Edit Query button 1304. Changes to host variable names used as search criteria will impact the corresponding COBOL code that will be created by clicking on the Save/Add to Code button 1306. The Execute button 1308 initiates query execution (e.g., for testing purposes), while clicking on Save/Add to Code button 1306 saves or adds the query to application code, such as to a COBOL program. User edits to the SQL code originating from the Preview screen 1300 may be reverted back to the query built via the CAT screen input by clicking on the Reset button 1310. This is beneficial when manual changes are needed to be backed out and the user wishes to return to the previously generated query. In an embodiment, the user may elect to perform a UNION operation on two or more saved queries via the Add Union buttons 1312.

Test Execute Select Query Screen

Figure 14:
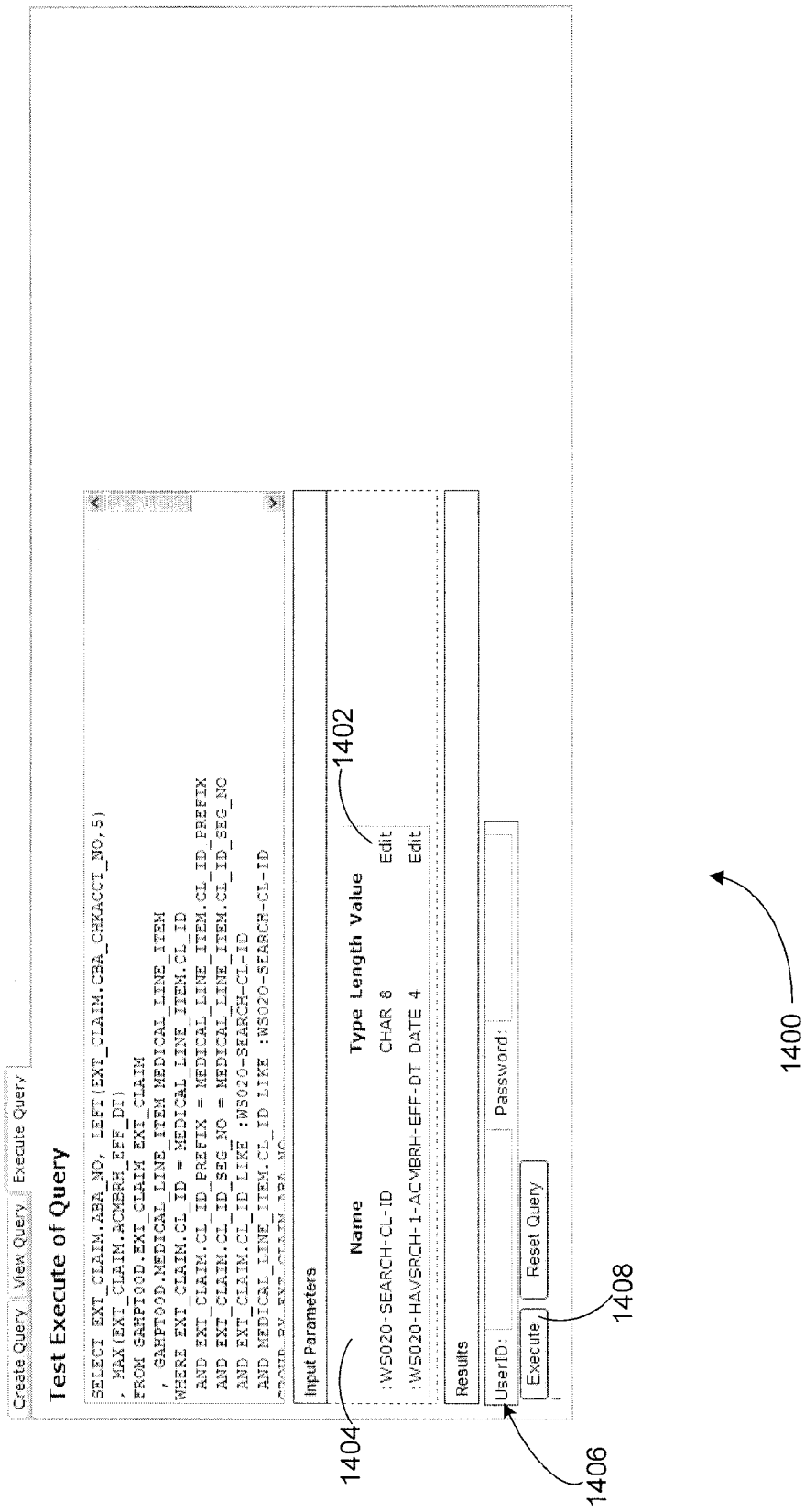
FIG. 14 is a diagram illustrating test execute of query screen of the CAT tool, as contemplated by an embodiment of the invention.

Turning to FIG. 14, an embodiment of the Test Execute Query screen 1400 is shown. Query constructed via user input collected through query construction screens 400-1200 and/or via direct SQL code edits from Preview Query Screen 1300 may be test executed prior to incorporating the query into external application code (e.g., into COBOL). In order to substitute values for COBOL host variables, the user clicks on "Edit" button 1402 corresponding to the specific host variable name in the Input Parameter panel 1404 which allows the assignment of desired values for the input parameters.

Figure 15:
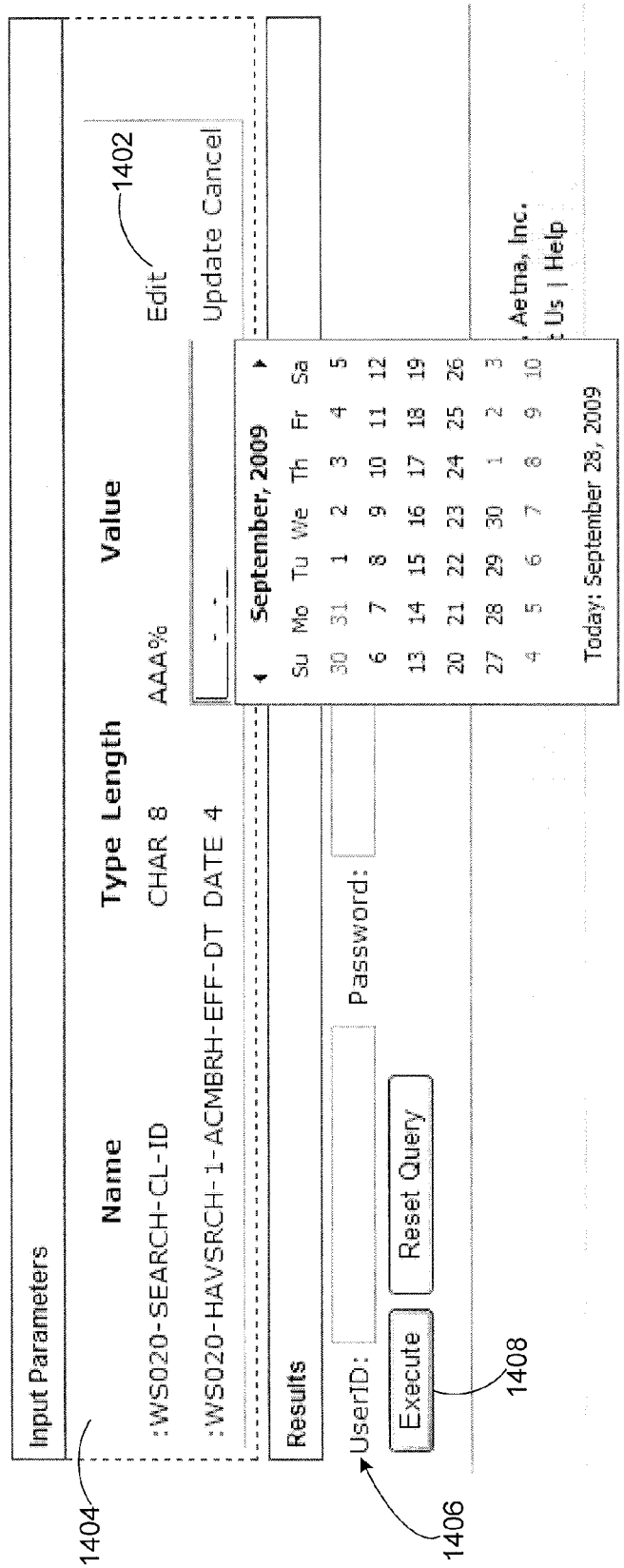
FIG. 15 is a diagram illustrating a user interface prompt for accepting user input of a value of an input parameter, as contemplated by an embodiment of the invention.

With reference to FIG. 15, entering a value and clicking on "Update" assigns the user supplied value to the parameter. In one embodiment, a default calendar is displayed for accepting user input of a date field. Alternatively or in addition, to select a date a user can type in a specific date. To execute the query, the user types in a Mainframe User ID and Password in their respective boxes 1406 and clicks on the Execute button 1408.

Turning to FIG. 16, the query test execution results, with substituted values for host variables, are displayed in the SQL Query panel 1600. Preferably, the screen 1600 displays the SQL code as well as the query results in respective panels 1602, 1604 for ease of troubleshooting and query result verification prior to incorporating the query into the application code. To reset the query back to version created via user input supplied through CAT tool screens 400-1200 and enter different values for host variables, the user click on "Reset Query" button 1606.

Specifying a Subquery

Subquery processing is available for Index, Secondary, and Having search criteria. In an embodiment, there is a limit of up to 10 subqueries that can be created for a given query so as not to cause poor query performance. Edit checks are also included to make sure subquery column comparisons are valid. Since EXISTS and NOT EXISTS operations are only valid for subqueries, if these are selected in the corresponding foregoing screens, a subquery is automatically created. To choose to have a subquery associated to a column, the user selects a Subquery check box 718 (see e.g., FIG. 7). In the Preview Query Screen 1300 (FIG. 13), a designation of "Not Completed" and the text, "SUBQUERY" is displayed to indicate that a subquery is being constructed. The "Execute" and "Save/Add to Code" buttons will not be available until the subquery is finally created.

In one embodiment, building the subquery follows the same process as building any other query except for the following distinctions:

1) Only a Select query can be created;
2) Only 1 column can be returned from the query; and
3) Nested subqueries are not available.

However, further embodiments forego some or all of the above subquery limitations. Preferably, when creating a subquery, a message is displayed at the top of a corresponding screen panel that displays the view and column of the outer query that this subquery is to be associated to. Once the subquery has been created, the subquery is included in the main query and the displayed subquery status changes to "Completed". Once all subqueries have been built, the Execute and Save/Add to Code buttons become available. A user can edit a subquery by highlighting its name in the Queries list box of FIG. 13. When doing this, the subqueries will stay completed unless the column in the main query associated to any subquery changes. In this case, the corresponding subquery will need to be re-created.

In one embodiment, the following Edit checks are performed to make sure a Union or Union All statement is valid:

Number of column in all queries must be the same.
Data types of columns in each position of the queries must be the same. If second column of first query is an Integer data type, then every column in second position must be an Integer data type.

Character data types of subsequent queries can not have the length larger than the first query.

Application Program Code Generation

Save/Add Query to Code

To add the constructed query to an application program, the user selects the Save/Add to Code button 1306 from the Preview of Query screen 1300 (FIG. 13). As illustrated in FIG. 17, in response to this selection, the user is prompted to enter a program id, program type (e.g., the application code to which the query is to be added, such as COBOL, COBOL/CICS, Java, C++, or the like), as well as a desired Service Level Agreement (SLA) execution performance in seconds via the Program Inputs screen 1700.

A program SLA value is used during the retry of any SQL call that returns a non-fatal return code and that is available to be re-tried. In an embodiment, each SQL call that is allowable will be re-tried up to three (3) times with a delay of one third of the SLA specified. This is to insure that a program will be given up to the SLA time to try and re-execute the call.

When the user selects the Create button 1702, the Code Automation Tool automatically creates the application code necessary to embed the previously created and optimized SQL query into the specified application program.

As shown in FIG. 18, the program code is created and displayed in the View Component/Code tab 1802. The user has the ability to edit the resulting application code incorporating the query directly from the Preview of Code screen 1800.

The following required application code is automatically created:

DB2 SQL error handling;

DB2 retry logic;

DB2 DCLGEN's;

All host-variable definitions for search variables;

All cursor logic (Declare, Open, Fetch, Update, Delete, Close), if required; and All host variables for scalar function values.

Any of the queries that are included in the program can be edited and then re-added to the program. This enables the user to create a program with several different queries or query types (e.g., Select, Insert, Update, Delete) and modify a query without having to re-create the entire program and other queries. While any portion of the program code can be edited or copied, the entire program can also be copied to a local or network drive by selecting the Download button 1806.

To add additional queries to the application program, the user selects the Add Another Query button 1808, which then directs the user to the Create Query tab to begin the process of creating a new query. Alternatively, the user is presented with a dialog box for selecting a previously saved query.

When the user selects the Edit Queries button 1804, the Saved Queries screen 1900 is displayed in the Edit Queries tab 1902, as shown in FIG. 19. Initially, all queries that were created to be included in the program will be listed in the Saved Main Query list box 1904. The queries that make up the main query will be listed in the Saved Query Detail list box 1906. This facilitates editing of queries with subqueries or unions. Clicking on the main query name in the list box 1904 displays the queries that make up the main query in the Save Query Detail list box 1906. If there are no subqueries or unions, then the main query will be displayed.

To select a query to see the status and parameters that made up the query, on the user selects the query name in the Saved Query Detail list box 1906. All the information that is used to create the selected query is displayed. The high-level query description is located in the Query description area 1908. The views that were specified for the query are located in the Query Views list box 1910. The columns that are retrieved from the views are listed in the Selected Fields list box 1912. The Index and secondary search criteria's are listed in the Primary Search 1914 and Secondary Search 1916 list boxes. The complete SQL query is located in the SQL Query list box 1918.

From this screen, the user can remove a query from the application program code by selecting the Remove button 1920 or edit the query by selecting the Edit button 1922. When choosing to edit the existing query, the user is directed to the Create Query tab to modify any part of the query. Once completed, the user adds the query back to the program by selecting Save/Add to Code from the View Query tab, as discussed above.

Figure 20:
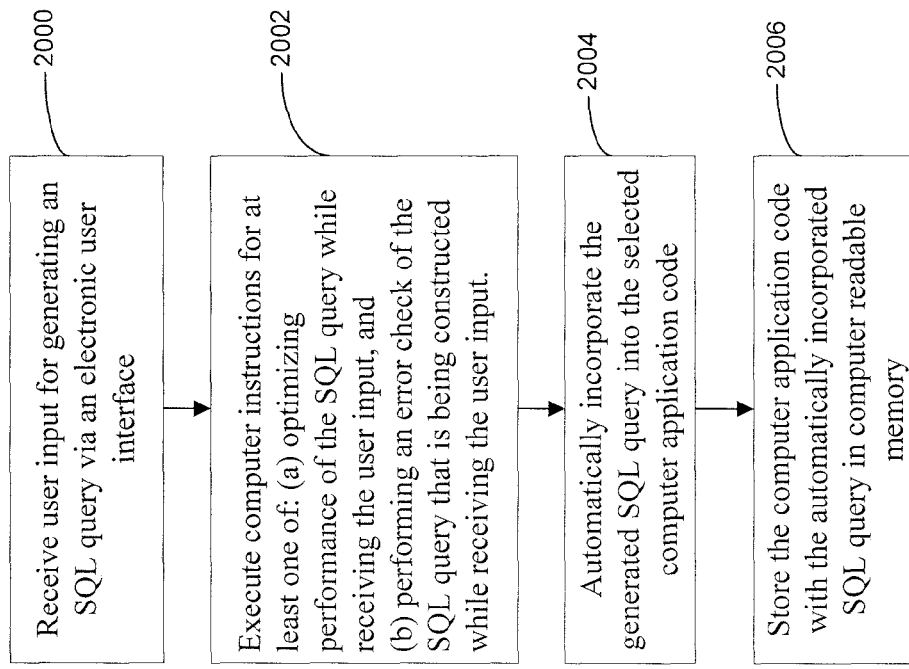
FIG. 20 is a method for computer application code automation employing the CAT tool if FIGS. 3-19, as contemplated by an embodiment of the invention.

Finally, turning to FIG. 20, a method is illustrated for computer application code automation. In step 2000, the code automation computer server receives user input for generating an SQL query via an electronic user interface of FIGS. 3-19. The user input comprises a plurality of SQL tokens (e.g., SQL statements, functions, input parameters values, or the like). In step 2002, the code automation computer server executes, via a processor connected to computer readable memory initialized with an application code development environment computer executable instructions for at least one of: (a) optimizing performance of the SQL query while receiving the user input, and (b) error checking the SQL query while receiving the user input. In step 2004, the code automation computer server automatically incorporates the generated SQL query into the selected computer application code. In step 2006, the code automation computer server stores the computer application code with the automatically incorporated SQL query in computer readable memory.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for computer application code automation, the system comprising:
 a code automation computer server configured for presenting an electronic user interface for receiving user input for generating a Structured Query Language (SQL) query, the user input comprising a plurality of SQL tokens;
 a processor, associated with the code automation computer server, for receiving the plurality of SQL tokens, the processor retrieving from memory and executing computer executable instructions for:
 displaying a first electronic user interface screen for accepting a first partial portion of the user input comprising the plurality of SQL tokens,
 performing a check to identify a possible error or a query performance problem based on the first partial portion of the user input,
 displaying a warning screen when the first partial portion of the user input is associated with a possible error or a query performance problem; and
 displaying a second electronic user interface screen for accepting a second partial portion of the user input comprising the plurality of SQL tokens, wherein the second electronic user interface screen is displayed after displaying the warning screen;
 wherein the processor is adapted for automatically incorporating the generated SQL query into the computer application code and storing the computer application code in a non-transitory computer readable medium.

2. The system of claim 1 wherein the electronic user interface is a web-based interface.

3. The system of claim 1 wherein the processor is further adapted for automatically incorporating at least one of error handling and retry logic into the computer application code.

4. The system of claim 1 wherein the computer executable instructions for error checking while receiving the user input further comprise generating a real-time prompt to supply missing information for at least one SQL token supplied by the user based on a predetermined syntax of the SQL token.

5. The system of claim 1 wherein the computer executable instructions for error checking while receiving the user input further comprise generating a real-time prompt to correct a syntax error for at least one SQL token supplied by the user based on a predetermined syntax of the SQL token.

6. The system of claim 1 wherein the computer executable instructions for optimizing performance of the SQL query while receiving the user input further comprise generating, in real-time, a suggestion to modify at least one SQL token supplied by the user for improving performance of the resulting SQL query.

7. The system of claim 1 wherein the processor is further adapted for accepting user input for modifying an input parameter value corresponding to at least one SQL token supplied by the user.

8. The system of claim 1 wherein the processor is further adapted for receiving user input for test executing the generated SQL query for displaying a query search result value.

9. The system of claim 1 wherein the processor is further adapted for receiving a user selection of a computer programming language for generating the computer application code into which to incorporate the generated SQL query.

10. A method for computer application code automation, the method comprising:
 displaying a first electronic user interface screen presented by a code automation computer server for accepting user input for generating a Structured Query Language (SQL) query, the user input comprising a plurality of SQL tokens;
 receiving, via an electronic user interface presented by the code automation computer server, a first partial portion of the user input for generating the SQL query;
 executing, via a processor associated with the code automation computer server, computer executable instructions for:
 performing a check to identify a possible error or a query performance problem based on the first partial portion of the user input,
 displaying a warning screen when the first partial portion of the user input is associated with a possible error or a query performance problem; and
 displaying a second electronic user interface screen for accepting a second partial portion of the user input comprising the plurality of SQL tokens, wherein the second electronic user interface screen is displayed after displaying the warning screen; and
 automatically incorporating the generated SQL query into the computer application code and storing the computer application code in a computer readable memory.

11. The method of claim 10 wherein the electronic user interface is a web-based interface.

12. The method of claim 10 further comprising automatically incorporating at least one of error handling and retry logic into the computer application code.

13. The method of claim 10 further comprising generating a real-time prompt to supply missing information for at least one SQL token supplied by the user based on a predetermined syntax of the SQL token.

14. The method of claim 10 further comprising generating a real-time prompt to correct a syntax error for at least one SQL token supplied by the user based on a predetermined syntax of the SQL token.

15. The method of claim 10 further comprising generating, in real-time, a suggestion to modify at least one SQL token supplied by the user for improving performance of the resulting SQL query.

16. The method of claim 10 further comprising accepting user input for modifying an input parameter value corresponding to at least one SQL token supplied by the user.

17. The method of claim 10 further comprising receiving user input for test executing the generated SQL query for displaying a query search result value.

18. The method of claim 10 further comprising receiving a user selection of a computer programming language for generating the computer application code into which to incorporate the generated SQL query.

19. A non-transitory computer readable medium having stored thereon computer executable instructions that, when executed by a processor, cause a computer system to perform computer application code automation, by performing the steps of:
 displaying a first electronic user interface screen presented by a code automation computer server for accepting user input for generating a Structured Query Language (SQL) query, the user input comprising a plurality of SQL tokens;

receiving, via an electronic user interface presented by the code automation computer server, a first partial portion of the user input for generating the SQL query;

executing, via a processor associated with the code automation computer server, computer executable instructions for:

performing a check to identify a possible error or a query performance problem based on the first partial portion of the user input, displaying a warning screen when the first partial portion of the user input is associated with a possible error or a query performance problem, and displaying a second electronic user interface screen for accepting a second partial portion of the user input comprising the plurality of SQL tokens, wherein the second electronic user interface screen is displayed after displaying the warning screen; and automatically incorporating the generated SQL query into the computer application code.

20. The non-transitory computer readable medium of claim 19 wherein the instructions further comprise automatically incorporating at least one of error handling and retry logic into the computer application code.

21. The non-transitory computer readable medium of claim 19 wherein the instructions further comprise generating a real-time prompt to supply missing information for at least one SQL token supplied by the user based on a predetermined syntax of the SQL token.

22. The non-transitory computer readable medium of claim 19 wherein the instructions further comprise generating a real-time prompt to correct a syntax error for at least one SQL token supplied by the user based on a predetermined syntax of the SQL token.

23. The non-transitory computer readable medium of claim 19 wherein the instructions further comprise generating, in real-time, a suggestion to modify at least one SQL token supplied by the user for improving performance of the resulting SQL query.

24. The non-transitory computer readable medium of claim 19 wherein the instructions further comprise accepting user input for modifying an input parameter value corresponding to at least one SQL token supplied by the user.

25. The non-transitory computer readable medium of claim 19 wherein the instructions further comprise receiving user input for test executing the generated SQL query for displaying a query search result value.

26. The non-transitory computer readable medium of claim 19 wherein the instructions further comprise receiving a user selection of a computer programming language for generating the computer application code into which to incorporate the generated SQL query.

* * * * *